Patented Aug. 4, 1953

2,647,818

UNITED STATES PATENT OFFICE 2,647,818

PROCESS OF PREPARING BERYLLIUM FLUORIDE

Henry C. Kawecki, Temple, Pa., assignor to The Beryllium Corporation, a corporation of Delaware No Drawing. Application February 28, 1947, Serial No. 731,724

6 Claims. (Cl. 23—88)

The present invention relates to a process of preparing beryllium fluoride, and more particularly to a process for producing beryllium fluoride wherein beryllium basic acetate is reacted either with ammonium fluoride or ammonium bifluoride and is subsequently recovered from the reaction mixture.

It is an object of the invention to prepare beryllium fluoride by a simplified procedure as compared with the prior practices.

It is a further and more specific object of the invention to prepare beryllium fluoride of a high state of purity.

Other objects and advantages of the invention will be apparent from the more detailed description set forth below.

The invention is based upon my discovery that beryllium basic acetate and either of the ammonium fluoride salts, $NH_4F$ and $NH_4HF_2$, may be reacted to form a semi-liquid product which appears, in the case where ammonium fluoride is employed, to be a mixture of beryllium fluoride, ammonium acetate, ammonia and water. When ammonium bifluoride is used, the reaction products, besides beryllium fluoride, appear to be acetic acid, ammonium acetate and water. By heating the reaction product obtained in either case to around 200–500° C. the acetic acid component is liberated and driven off along with the ammonia, the beryllium fluoride remaining behind.

The process lends itself to the production of beryllium fluoride of a high degree of purity when purified beryllium basic acetate is employed as one of the initial materials. This latter compound may be recovered in a highly pure state by first reacting crude beryllium hydroxide with glacial acetic acid and thereafter distilling the resultant basic acetate away from residual impurities such as iron oxide, alumina and silica.

By way of example, one molar proportion of beryllium basic acetate crystals obtained in the manner above described is mixed with four mols of ammonium bifluoride and heated with stirring until the reaction has been completed, whereupon a semi-liquid mixture will have been obtained. This mixture may then be heated in the same vessel or transferred to a second vessel and heated there to a temperature of between about 200 and 500° C. This treatment is continued until all of the ammonia and the acetic acid have been removed. The vapors evolved are preferably passed through a condenser wherein the acetic acid is condensed and recovered for reuse. The solid residue from this operation will consist of beryllium fluoride of a high degree of purity. The same procedure as above outlined may be followed when the normal ammonium fluoride, $NH_4F$, is used, in which case, however, the proportion of the reactants should be one mol of beryllium basic acetate to eight mols of ammonium fluoride.

Notwithstanding the emphasis hereinbefore placed upon the use of pure beryllium basic acetate in carrying on the reaction, it will be understood that the invention is not deemed to be limited in this respect. In its broader aspects, the invention is considered to cover the process of reacting beryllium basic acetate and either one of the ammonium fluoride salts, $NH_4F$ and $NH_4HF_2$, even when the acetate or both acetate and the fluoride contain impurities.

I claim:

1. The process of preparing beryllium fluoride which comprises reacting substantially pure beryllium basic acetate with one of the ammonium fluoride salts of the group consisting of ammonium fluoride and ammonium bifluoride, and thereafter recovering the beryllium fluoride from the reaction mixture.

2. The process of preparing beryllium fluoride which comprises reacting beryllium basic acetate and one of the ammonium fluoride salts of the group consisting of ammonium fluoride and ammonium bifluoride, and thereafter heating the resulting product at a temperature sufficient to remove the ammonia and acetic acid components.

3. The process according to claim 2 wherein the acetic acid driven off from the reaction mixture is condensed and recovered for reuse.

4. The process of preparing beryllium fluoride which comprises reacting beryllium basic acetate and one of the ammonium fluoride salts of the group consisting of ammonium fluoride and ammonium bifluoride, and thereby forming beryllium fluoride, ammonium acetate, acetic acid and water, and thereafter heating the reaction mixture within the range 200–500° C. until the ammonia and acetic acid components have been removed.

5. The process of preparing beryllium fluoride which comprises reacting beryllium basic acetate and ammonium bifluoride to form beryllium fluoride, ammonium acetate, acetic acid and water, and thereafter heating the reaction mixture within the range 200–500° C. until the ammonia and acetic acid components have been removed.

6. The process of preparing beryllium fluoride which comprises reacting beryllium basic acetate and ammonium fluoride to form beryllium fluoride, ammonium acetate, ammonia and water, and thereafter heating the reaction mixture within the range 200–500° C. and thereby decomposing the ammonium acetate and driving off the decomposition products thereof.

HENRY C. KAWECKI.

References Cited in the file of this patent

UNITED STATES PATENTS

| Number | Name | Date |
| --- | --- | --- |
| 2,173,290 | Adamoli | Sept. 19, 1939 |
| 2,233,465 | Adamoli | Mar. 4, 1941 |

OTHER REFERENCES

Parsons, vol. 26, J. Amer. Chem. Soc., pp. 738 and 739.

Gmelin-Kraut, Handbuch der Anorganische Chemie 2.2, pp. 536, 544.

Mellor, vol. 4, p. 299, Treatise on Inorganic and Theoretical Chemistry, Longmans, Green and Co.